United States Patent [19]

Chung

[11] Patent Number: 5,567,094
[45] Date of Patent: Oct. 22, 1996

[54] SPEED CHANGE CONTROL MECHANISM OF A VERTICAL MILLING MACHINE

[76] Inventor: Liao Y. Chung, P.O. Box 82-144, Taipei, Taiwan

[21] Appl. No.: 563,975

[22] Filed: Nov. 29, 1995

[51] Int. Cl.⁶ .............................. B23Q 5/16; B23B 39/00; F16H 7/00
[52] U.S. Cl. ........................ 409/183; 408/128; 474/72
[58] Field of Search ...................... 409/64, 231, 183, 409/185; 408/128, 129, 124; 29/64; 474/69, 72, 29, 93

[56] References Cited

U.S. PATENT DOCUMENTS

| | | | |
|---|---|---|---|
| 2,145,545 | 1/1939 | Johnson et al. | 474/29 |
| 3,718,405 | 2/1973 | Keiter | 408/128 |
| 5,061,124 | 10/1991 | Chen | 408/128 X |

FOREIGN PATENT DOCUMENTS

| | | | |
|---|---|---|---|
| 4233948 | 4/1994 | Germany | 408/128 |
| 214538 | 12/1984 | Japan | 408/128 |

*Primary Examiner*—William R. Briggs
*Attorney, Agent, or Firm*—Alfred Lei

[57] ABSTRACT

A speed change control mechanism including a motor for power output, a main shaft, a belt transmission mechanism driven by the motor to turn the main shaft, a gear box disposed at one side of the main shaft, the gear box comprising a gear shaft, a small gear slidably mounted around the gear shaft and stopped from rotary motion relative to the gear shaft, the small gear being moved into engagement with a big gear which is fixedly mounted around the main shaft, wherein a bearing means is fixedly secured to the small gear, a rack is fixedly mounted on the bearing means and meshed with a toothed shaft, the toothed shaft being rotated to move the small gear between the operative position, in which the small gear is engaged with the big gear of the main shaft for permitting the output power of the motor to be transmitted through the gear box to the main shaft for a low-speed milling operation, and the non-operative position, in which the small gear is disengaged from the big gear of the main shaft for permitting the output power of the motor to be transmitted through the belt transmission mechanism for a high-speed milling operation.

3 Claims, 4 Drawing Sheets

5,567,094

SPEED CHANGE CONTROL MECHANISM OF A VERTICAL MILLING MACHINE

BACKGROUND OF THE INVENTION

1. Field of the Invention

This invention relates to vertical milling machines, and relates more specifically to the speed change control mechanism of a vertical milling machine which can be conveniently operated to stably shift the output power of the motor to the main shaft of machine through a low-speed transmission mechanism or a high-speed transmission mechanism.

2. Description of the Prior Art

The speed change control mechanism of a regular vertical milling machine, as shown in FIGS. 3 and 4, generally comprises a motor housing base 10, a motor 11 mounted in the motor housing base 10, a driving belt wheel 12 driven by the motor 11, a gear box 20 disposed at one side of the motor housing base 10. The gear box 20 comprises a driven belt wheel 14 fixedly mounted around a shaft 15 and turned by the driving belt wheel 12 through a transmission belt 13. The shaft 15 has a toothed portion 151 at one end, and is fixedly mounted with a gear 16 adjacent to the toothed portion 151. The gear 16 is meshed with a big Gear 17 for reduction of revolving speed. A pinion 21 is fixedly mounted around the gear shaft of the big gear 17 for engagement with a big gear 22, which is mounted on an auxiliary shaft 23, which is sleeved onto the main shaft 24 of the milling machine and locked in place. The auxiliary shaft 23 has a toothed portion 231 for engagement with the toothed portion 251 of the shaft 15. A bearing 251 is mounted on the auxiliary shaft 23 to hold a rack 2511. The rack 2511 is meshed with a toothed shaft 26. When the toothed shaft 26 is rotated, the rack 2511 is reciprocated, and the toothed portion 231 of the auxiliary shaft 23 is forced into engagement with the big gear 22 or forced away from the big gear 22, and therefore the revolving shaft is controlled. FIG. 3 shows the milling machine set at the high speed mode. As illustrated in FIG. 3, the big gear 22 is meshed with the pinion 21, and the gear 16 is meshed with the big gear 17. When the motor 11 is started, the output power of the motor 11 is transmitted through the driving belt wheel 12 and the driven belt wheel 14 to the shaft 15 and then to the main shaft 24 of the milling machine for a low-speed milling operation. When a high-speed milling operation is required, the toothed portion 231 of the auxiliary shaft 23 is forced into engagement with the toothed portion 251 of the shaft 15 (see FIG. 4) for direction transmission of the output power of the motor 11 to the auxiliary shaft 23 and the main shaft 24 without through the belt wheels 12 and 14. When at the high-speed mode as shown in FIG. 4, the auxiliary shaft 23 and the bearing 25 are forced upwards by the toothed shaft 26, and the toothed portion 231 of the auxiliary shaft 23 is forced into engagement with the toothed portion 151 of the shaft 15. The main drawback of this speed change control mechanism is that the main shaft 24 cannot be stably supported when at the high-speed mode. Because the size of the pinion 21 is about 21 mm, the gap is for example about 1 mm when the pinion is disengaged, and the depth of the engagement between the toothed portions 151 and 231 is about 3 mm, the up stroke of the auxiliary shaft 23 is as long as 18 mm. Therefore, the main shaft 24 tends to vibrate when it is operated at the high-speed mode.

SUMMARY OF THE INVENTION

This invention is designed to provide a speed change control mechanism for vertical milling machines which eliminates the aforesaid problem.

It is therefore the main object of the present invention to provide a speed change control mechanism which can be conveniently controlled to change the operation speed of the milling machine without causing a vibration to the main shaft of the machine. According to the present invention, the speed change control mechanism comprises a motor for power output, a main shaft, a belt transmission mechanism driven by the motor to turn the main shaft, a gear box disposed at one side of the main shaft, the gear box comprising a gear shaft, a small gear slidably mounted around the gear shaft and stopped from rotary motion relative to the gear shaft, the small gear being moved into engagement with a big gear which is fixedly mounted around the main shaft, wherein a bearing means is fixedly secured to the small gear, a rack is fixedly mounted on the bearing means and meshed with a toothed shaft, the toothed shaft being rotated to move the small gear between the operative position, in which the small gear is engaged with the big gear of the main shaft for permitting the output power of the motor to be transmitted through the gear box to the main shaft for a low-speed milling operation, and the non-operative position, in which the small gear is disengaged from the big gear of the main shaft for permitting the output power of the motor to be transmitted through the belt transmission mechanism for a high-speed milling operation.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
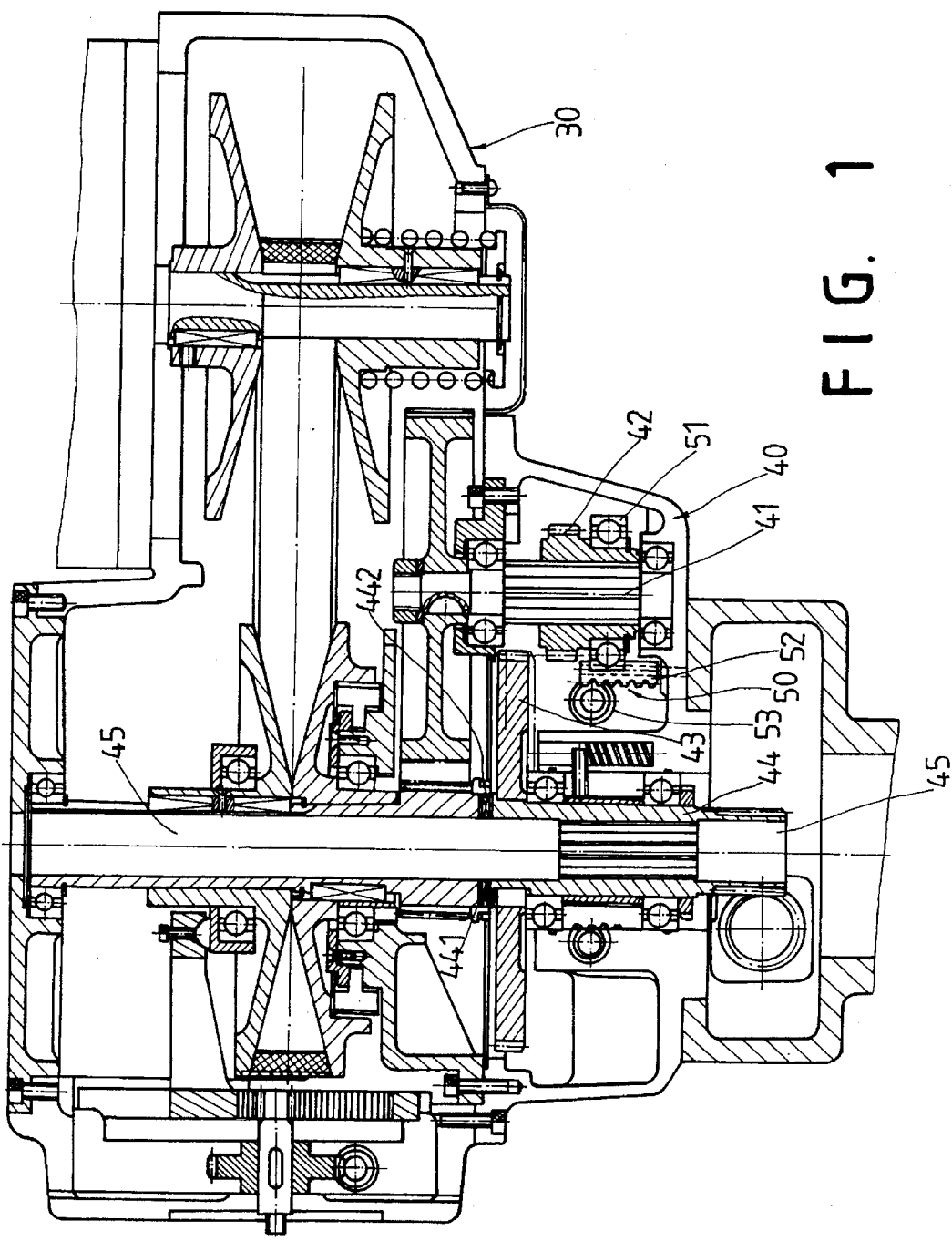
FIG. 1 is a sectional view showing a speed change control mechanism installed in a milling machine and set at the high-speed mode according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
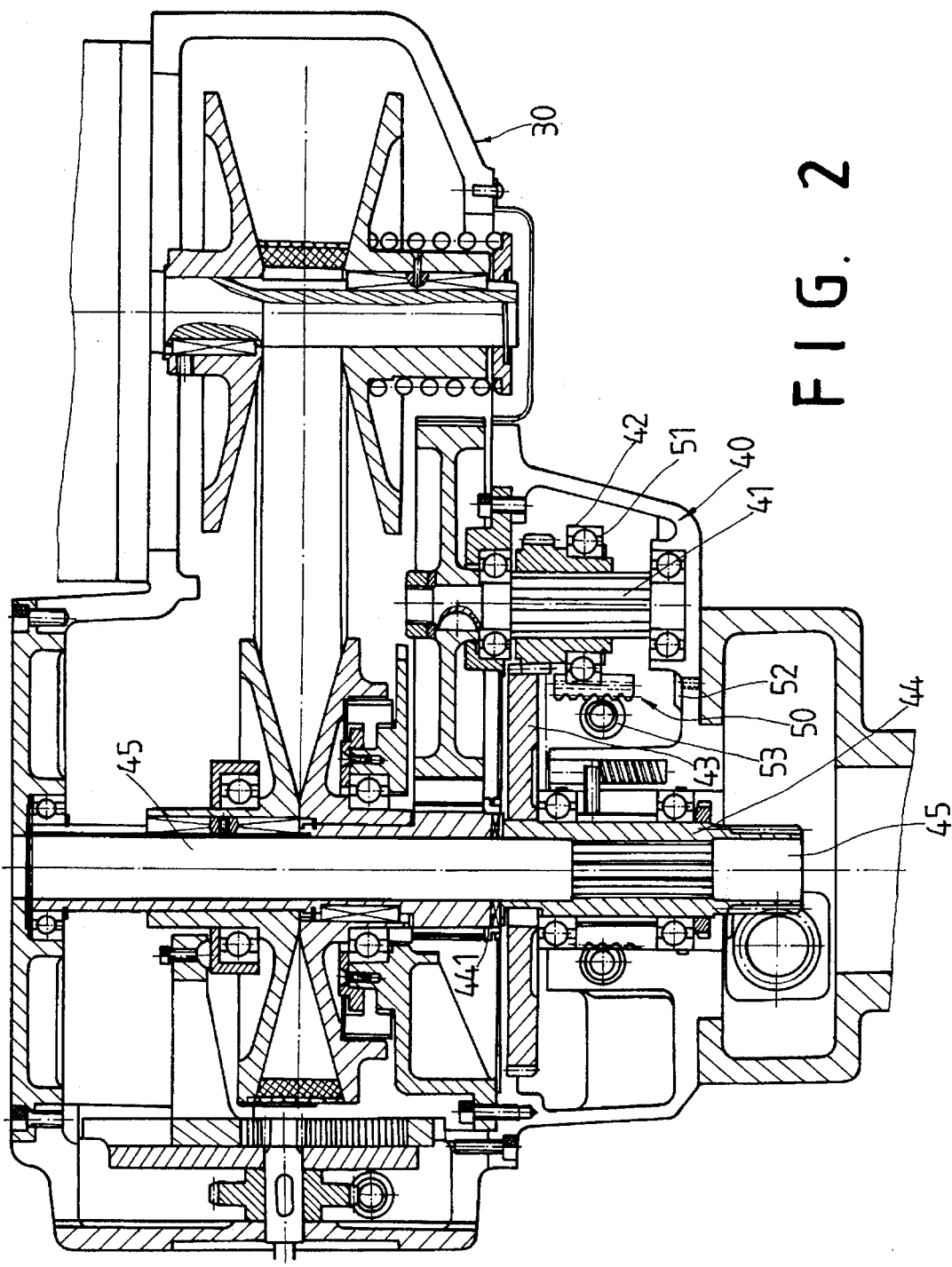
FIG. 2 is similar to FIG. 1 but showing the speed change control mechanism shifted to the low-speed mode.
Figure 3:
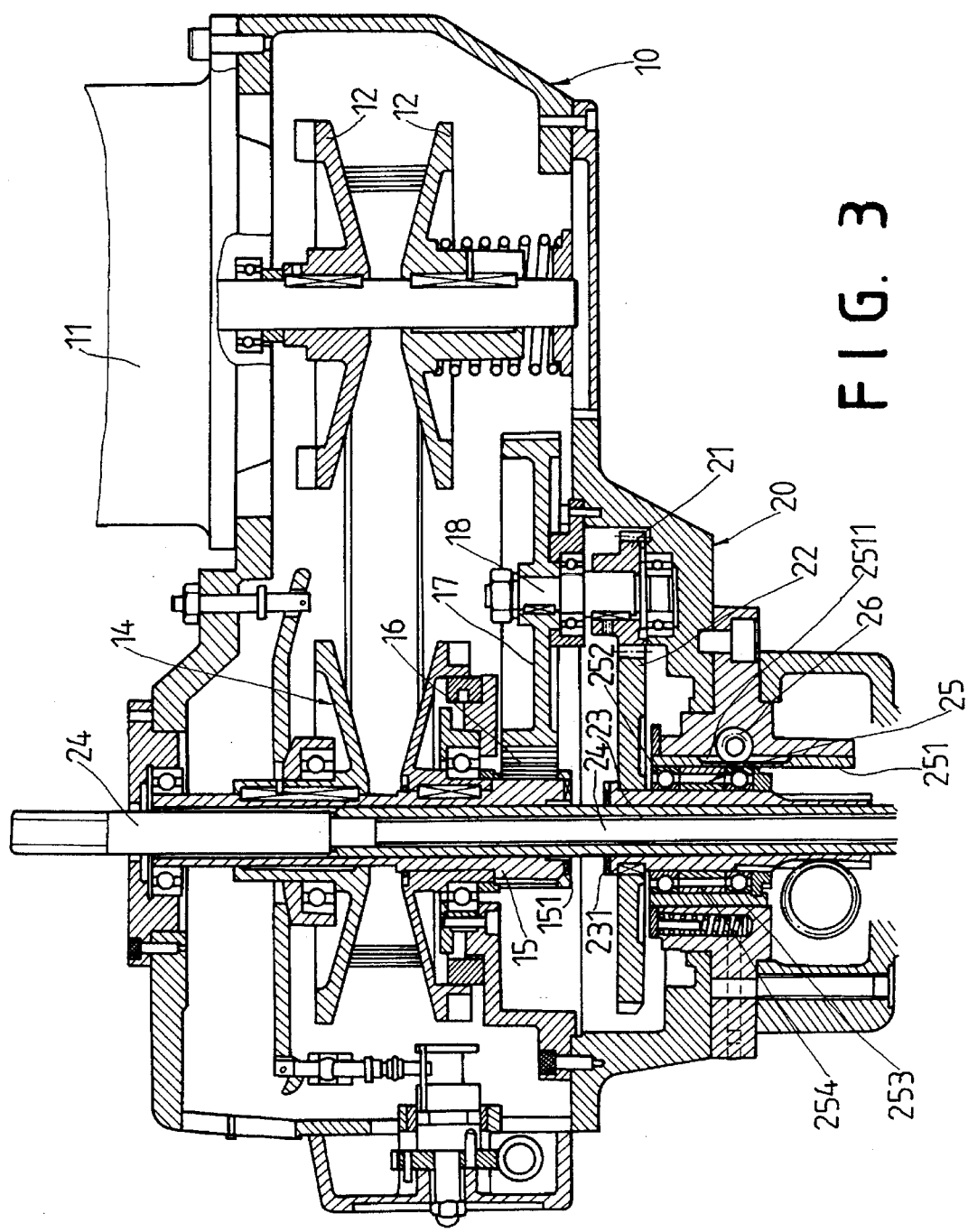
FIG. 3 is a sectional view showing a speed change control mechanism installed in a milling machine and set at the high-speed mode according to the prior art.
Figure 4:
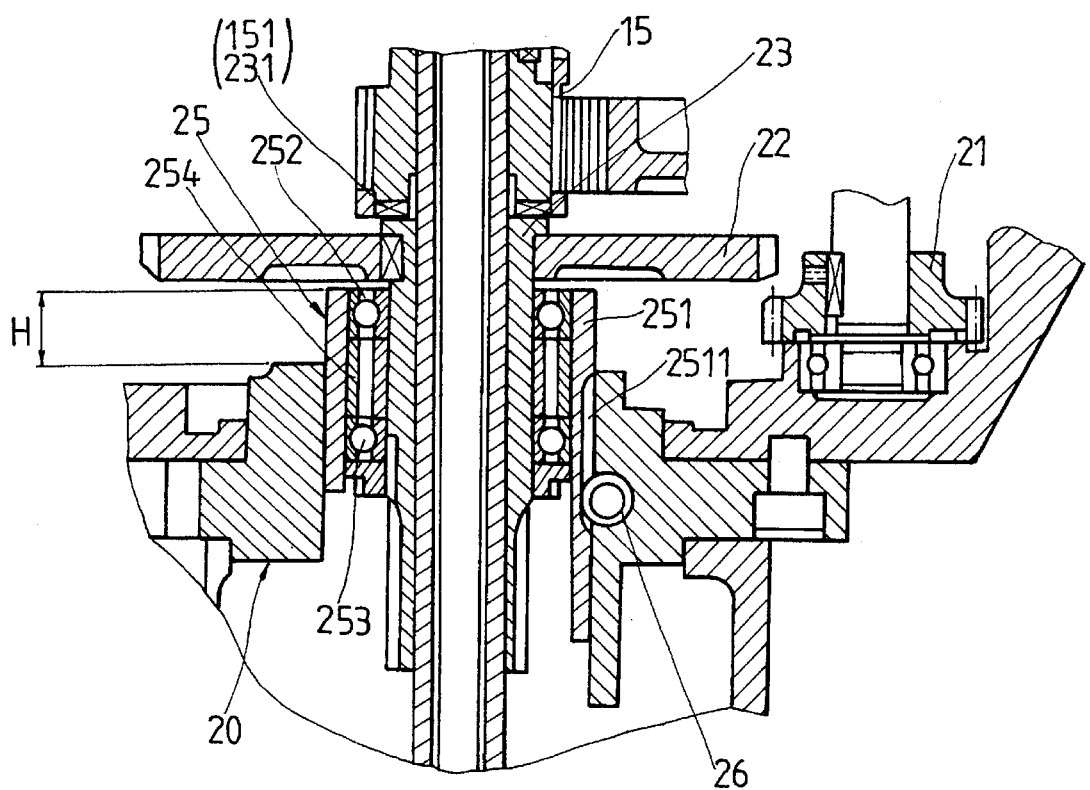
FIG. 4 shows the speed change control mechanism of FIG. 3 shifted to the low-speed mode.

Referring to FIGS. 1 and 2, the output power of the motor, referenced by 30, is transmitted to a main shaft 45. A gear box 40 is disposed at one side by the main shaft 45. The gear box 40 comprises a gear shaft 41, a small gear 42 slidably mounted around the gear shaft 41. The small gear 42 has longitudinal grooves (not shown) on the inside respectively engaged with respective longitudinal ribs (not shown) on the gear shaft 41. Therefore the small gear 42 can be moved longitudinally along the gear shaft 41, but is stopped from rotary motion relative to the gear shaft 41. The small gear 42 can be moved into engagement with a big gear 43, which is fixedly mounted around the main shaft 45. A bearing 52 is fixedly secured to the small gear 42 at one side. A rack 52 is fixedly mounted on the bearing 52 and meshed with a toothed shaft 53. By rotating the toothed shaft 53, the small gear 42 is moved between the operative position and the non-operative position. When the small gear 42 is moved into the operative position, it is forced into engagement with the big gear 43 of the main shaft 45, and therefore the output power of the motor 30 is directly transmitted through the gear box 40 to the main shaft 45. When the small gear 42 is moved to the non-operative position, it is disengaged from the big gear 43 of the main shaft 45, and therefore the output power of the motor 30 is transmitted through a belt transmission mechanism (not shown) for a high-speed milling operation. The aforesaid big gear 43 has a hollow gear shaft 44, and a toothed portion 441 at the top end of the gear shaft 44 for engagement with the main shaft 45. When the small gear 42 is forced into engagement with the big gear 43, the main shaft 45 can then be rotated at a low speed by motor 40 through the gear box 40.

It is to be understood that the drawings are designed for purposes of illustration only, and are not intended as a definition of the limits and scope of the invention disclosed.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A speed change control mechanism installed in a milling machine for high/low speed transmission control, comprising a motor for power output, a main shaft, a belt transmission mechanism driven by said motor to turn said main shaft, a gear box disposed at one side of said main shaft, said gear box comprising a gear shaft, a small gear slidably mounted around said gear shaft and stopped from rotary motion relative to said gear shaft, said small gear being moved into engagement with a big gear which is fixedly mounted around said main shaft, wherein a bearing means is fixedly secured to said small gear, a rack is fixedly mounted on said bearing means and meshed with a toothed shaft, said toothed shaft being rotated to move said small gear between the operative position, in which said small gear is engaged with the big gear of said main shaft for permitting the output power of said motor to be transmitted through said gear box to said main shaft for a low-speed milling operation, and the non-operative position, in which said small gear is disengaged from the big gear of said main shaft for permitting the output power of said motor to be transmitted through said belt transmission mechanism for a high-speed milling operation.

2. The speed change control mechanism of claim 1 wherein said small gear has longitudinal grooves on the inside respectively engaged with respective longitudinal ribs on said gear shaft.

3. The speed change control mechanism of claim 1 wherein said bearing means is an axle bearing integrally made on said small gear, and said rack is separately fixed to said axle bearing at one side by fastening means.

\* \* \* \* \*